(No Model.)

C. A. BAKER.
BRACKET.

No. 549,046. Patented Oct. 29, 1895.

WITNESSES:
William Goebel.

INVENTOR
C. A. Baker
BY
Munn & Co
ATTORNEYS.

United States Patent Office.

CHARLES A. BAKER, OF WAUKESHA, WISCONSIN, ASSIGNOR TO THE HENRY REUBEL COMPANY, OF NEW YORK, N. Y.

BRACKET.

SPECIFICATION forming part of Letters Patent No. 549,046, dated October 29, 1895.

Application filed February 19, 1895. Serial No. 538,922. (No model.)

*To all whom it may concern:*

Be it known that I, CHARLES A. BAKER, of Waukesha, in the county of Waukesha and State of Wisconsin, have invented a new and Improved Bracket, of which the following is a full, clear, and exact description.

The invention relates to extension-brackets; and its object is to provide a new and improved bracket which is comparatively simple and durable in construction, cheap to manufacture, and more especially designed for use on vestibule doors, windows, &c.

The invention consists, principally, of a tubular base formed with integral flanges for fastening the base in position on a door, window, or other support, a telescoping-bracket member having a head for supporting a rod or pole, and a split tubular shank fitted to slide in the said base and adapted to be secured thereto.

The invention also consists in certain parts and details and combinations of the same, as will be hereinafter fully described, and then pointed out in the claims.

Reference is to be had to the accompanying drawings, forming a part of this specification, in which similar letters of reference indicate corresponding parts in all the views.

Figure 1:
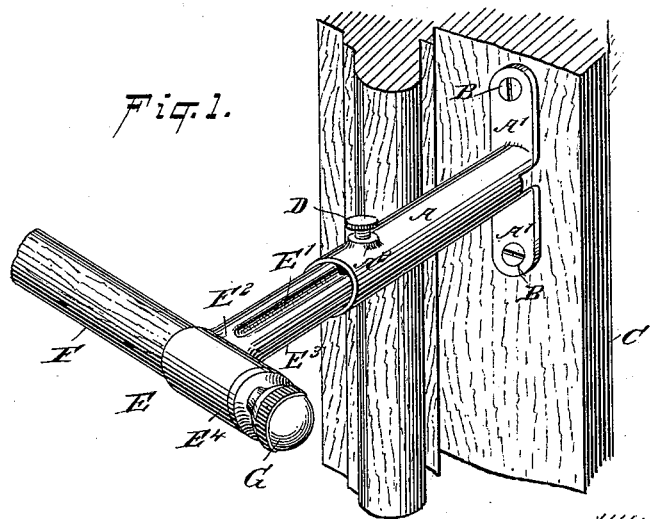
Figure 2:
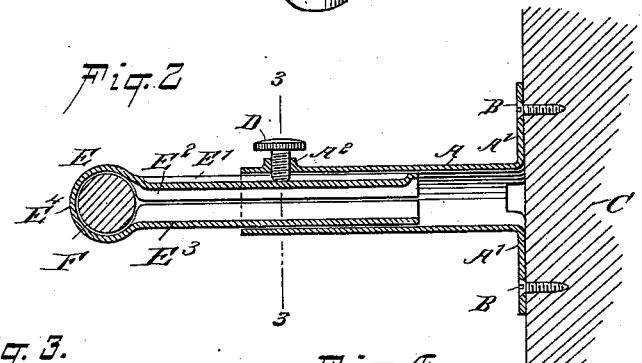
Figure 3:
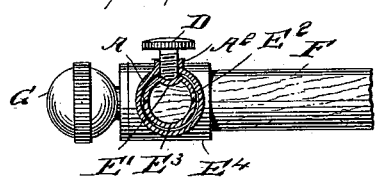
Figure 4:
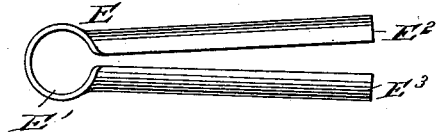

Figure 1 is a perspective view of the improvement as applied. Fig. 2 is a sectional side elevation of the same. Fig. 3 is a cross-section of the same on the line 3 3 of Fig. 2. Fig. 4 is a side elevation of the telescoping-bracket member, and Fig. 5 is a perspective view of a modified form of the improvement.

The improved bracket is provided with a tubular base A, being split at one end and struck up to form the flanges A', adapted to be engaged by screws B for fastening the flanges to a door, window, or other support C, on which the bracket is to be used. Near the forward end of the tubular base A is struck up a threaded boss $A^2$, in which screws a set-screw D, extending with its inner end into a longitudinally-extending groove E' struck up in the part $E^2$ of a tubular shank fitted to slide in the base A and forming part of the telescoping member E for the bracket. This member E is made of a single piece of sheet metal bent over to form the parts $E^2$ $E^3$ of the shank, the end or middle portion of the parts forming an eye $E^4$ for the reception of a rod or pole F to be supported by the bracket. Now it will be seen that by the arrangement described the tubular shank of the extension member by being split lengthwise can be readily inserted into the base A, and as the metal has a tendency to open at the free ends of the parts $E^2$ $E^3$, as shown in Fig. 4, a comparatively tight sliding fit is made in the base A. Furthermore, the longitudinal groove E' is struck up in the top of the part $E^2$, so that the entire extension or telescopic member E can be very cheaply manufactured.

The groove E' extends from near the eye $E^4$ to near the outer end of the part $E^2$, so that when the screw D is engaged in the boss $A^2$ and extends slightly into the said groove then the member E can be completely withdrawn, as the point of the screw abuts against the rear end of the groove at the time the member E is drawn out to its full extent. Thus the parts are not liable to be lost when once assembled.

Figure 5:
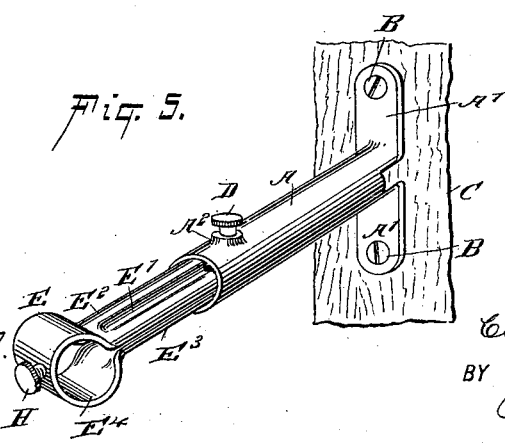

The eye $E^4$ may be adapted to receive a knob or a head G to finish up the outer end of the eye after the rod F is inserted, as illustrated in Figs. 1 and 3; but the said head may be omitted and a set-screw H employed on the eye $E^4$ to secure the rod F in place, as shown in Fig. 5.

It is understood that the construction of the base A and the telescopic extension E in Fig. 5 is the same otherwise in every other respect as the construction shown in Figs. 1 to 4.

Having thus described my invention, I claim as new and desire to secure by Letters Patent—

1. A bracket comprising a tubular base adapted for attachment to the wall or other support and provided with an open outer end, and a shank comprising a tubular split body adapted to telescope in the tubular base and provided with a retaining device whereby it is held in place in the said base, said shank being provided at its outer end with a socket, substantially as set forth.

2. A bracket comprising a tubular base adapted for attachment to the wall or other support and provided with an open outer end, a split tubular shank formed with a longitudinal groove and adapted to telescope in the tubular base, a set screw mounted in the base to engage the groove in the shank, and a socket formed at the outer end of said shank, substantially as set forth.

CHARLES A. BAKER.

Witnesses:
WM. A. LAWRENSON,
W. N. SEEBURGER.